3,236,602
COLORIMETER FLOW CELL AND HOLDER THEREFOR
Jack Isreeli, Tuckahoe, N.Y., assignor to Technicon Instruments Corporation, Chauncey, N.Y., a corporation of New York
Filed Oct. 18, 1962, Ser. No. 231,408
7 Claims. (Cl. 23—253)

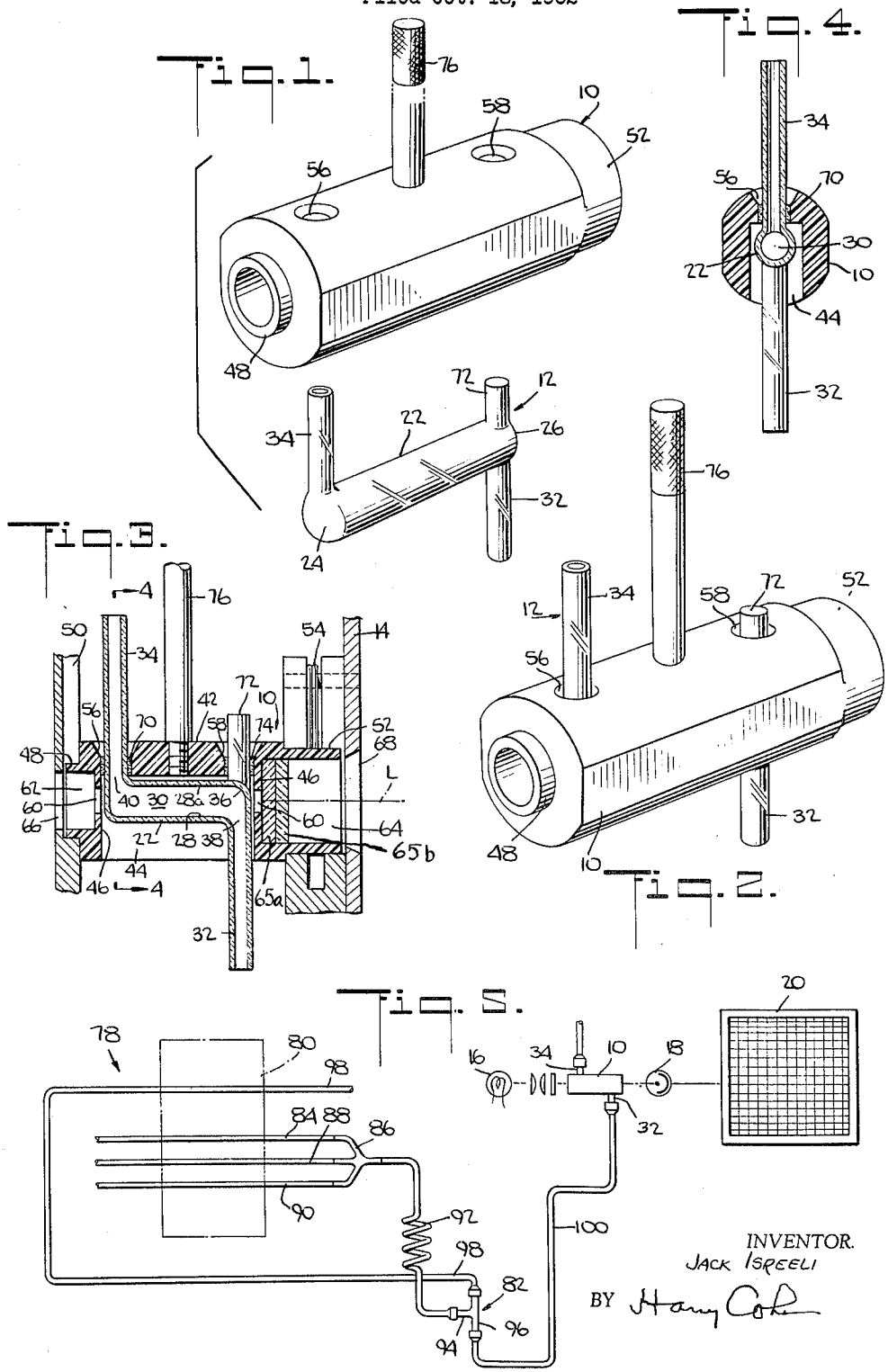

This invention relates to flow cells and holders therefor the colorimetric examination of a liquid to determine the quantity of a substance present in the liquid.

An object of the invention is to provide a colorimeter flow cell having provision for directing the flow of the incoming liquid in a maner which avoids interference of the colorimetric examination of the liquid by gas bubbles which might be present in the liquid.

Another object is to provide an improved flow cell and holder therefor which are of simple and inexpensive construction and yet which are especially effective for accurate colorimetric examinations of the liquid, even though the liquid is in relatively minute quantities.

The above and other objects, features and advantages of the invention will be more fully understood from the following description of the presently preferred embodiment of the invention considered in connection with the accompanying drawings which are to be considered as illustrative of the invention and not in limitation thereof.

In the drawing:

FIG. 1 is an exploded perspective view of the flow cell and holder, showing them in a disassembled condition;

FIG. 2 is a perspective view of the assembled flow cell and holder;

FIG. 3 is a vertical sectional view of the assembled holder and flow cell mounted in a colorimeter which is partially shown;

FIG. 4 is a vertical sectional view taken on line 4—4 of FIG. 3; and

FIG. 5 is a more-or-less diagrammatic view of an apparatus for the colorimetric treatment and examination of a liquid stream and which utilizes the flow cell of the present invention.

Referring now to the drawing in detail, a holder 10 is provided for mounting a flow cell 12, and the holder with its flow cell is adapted to be mounted in a colorimeter 14 which includes a light source 16 and a photolectric detector cell 18 that operates a recorder 20 which provides records of the light transmission characteristics of the liquid and which are indicative of the quantity of a substance in the liquid.

The flow cell comprises a medial, substantially horizontal tubular member 22 of a suitable material, for example glass, preferably of the type sold under the trademark "Pyrex." The opposite end walls 24 and 26 of member 22 are light-permeable and in axial alignment with each other, and the member is provided with an inner wall 28 which forms a substantially horizontal liquid flow passage 30 that extends between the end walls. A distal, substantially vertical inlet tube 32 extends downwardly from the bottom of member 22, adjacent end wall 26, and is in liquid flow communication with the passage at the corresponding end thereof. At the opposite end of the passage, a distal, substantially vertical outlet tube 34 is provided, in liquid flow communication with the passage at said opposite end, and this tube extends upwardly from the top of member 22, adjacent end wall 24. The inner diameter of the inlet tube 32 is advantageously made of a smaller diameter than the inner diameter of the passageway 30. The sample fluid is "debubbled" of air prior to its arrival at the flow cell, as will be discussed hereinafter with respect to FIG. 5, and only a small quantity of air, if any, will arrive at the flow cell. Any air bubbles passing through the inlet tube 32 will rise through the fluid in the passageway 30.

Wall 28 is provided with a curved part 36 which is positioned opposite the outlet end opening 38 of inlet 32, in the path of flow of the incoming liquid. As the liquid flows into passage 30 through inlet opening 38, its direction of flow is changed by curved wall part 36 from that which is substantially vertical to that which is substantially horizontal, whereby the liquid flows horizontally through passage 30 from inlet opening 38 to outlet opening 40, and the liquid is examined colorimetrically by the light beam L which passes substantially horizontally through passage 30 and the light-permeable end walls 24 and 26, respectively, of the cell. If any gas bubbles are present in the incoming liquid which is undergoing colorimetric examination, the bubbles rise upwardly in vertical inlet tube 32 and strike curved part 36 which directs their flow along the upper part 28a of wall 28, and out of the passageway 30 through the outlet tube 34, whereby the gas bubbles do not interfere with the colorimetric examination of the liquid. The curvature of wall part 36 is such as to provide a smooth flow of the gas bubbles and the liquid during the change of flow of the liquid and bubbles from a vertical direction to a horizontal direction and no gas bubbles are entrapped at wall part 36 due to said curvature whereby there is no collection of gas bubbles which might interfere with the colorimetric examination of the liquid. The presence of such unremoved gas bubbles in the passageway 30 does not adversely affect the colorimetric examination because of the relatively short time such bubbles remain in this passageway. It will be appreciated that forming the right-hand end wall 26 in line with and merging into the right-hand sidewall subportion of the inlet tube 32, as seen in FIG. 3, provides a single path of flow for the entering fluid, i.e., up and to the left through the passageway 30, avoiding the formation of dead fluid spaces which might trap gas bubbles in the right-hand portion of the passageway 30.

It is to be noted that the wall of tubular member 22 is relatively thin so that most, if not substantially all, of the light which enters the wall is reflected at its outer surface back through the wall and back into the liquid, and none, or substantially none, of the light which enters passage 30 is lost due to passage into the wall member 22.

A non-limiting but preferred example of the dimensions of the flow cell 12 is as follows: the horizontal or sight passageway 30 has an internal diameter of 3.0 mm. and an internal length of 15.0 mm., the vertical inlet passageway 32 has an internal diameter of 1.75 mm. and an internal length of 10.0 mm. The volume of fluid which the sight passageway 30 contains is substantially 0.1 ml. It will be understood that the length of passage 30 will vary depending upon the liquid being analyzed and the concentration of the substance present therein. Preferably, the flow cell is positioned so that member 22 is horizontal, as shown, but acceptable results can be obtained with the member in an inclined position which is preferably not more than about 30° from the horizontal.

The flow cell holder 10 comprises an elongated member 42 of a suitable material, preferably plastic, having a longitudinally extending bottom recesses or elongated vertical radial slot 44 that extends between the longitudinally spaced end walls 46 of the member. One end of member 42 is provided with a circular part 48 which extends axially from said end of the member into a vertical slot 50 provided in a part of the colorimeter 14, and the bottom of part 48 engages the bottom of the slot for supporting said end of the holder in the colorimeter. The opposite end of the holder is also provided with a circular part 52 which is removably and resiliently held in position in the colorimeter by springs 54 for supporting said other end of the holder in the colorimeter. The upper part of the holder is provided with longitudinally spaced apart, vertical radial bores or openings 56 and 58, respectively, which extend from the outer surface of the top of member 42 downwardly into recess 44.

In the mounted position of the flow cell 12 in its holder 10, tubular member 22 of the flow cell is positioned in recess 44 between end walls 46 of the holder with end walls 24 and 26 of the flow cell adjacent respective end walls of the holder, and each end wall is provided with a light aperture 60. The apertures are in axial alignment with each other to permit the light beam L to pass horizontally through the light-permeable end walls of the flow cell sight passageway 30. End recesses 62 and 64, respectively, are provided in the opposite ends of the holder and light openings 66 and 68 are provided in the parts of the colorimeter, adjacent recesses 62 and 64, respectively, to permit the light to pass from the light source 16 to the photoelectric detector 18. Filters 65a and 65b are suitably mounted in recess 64.

In the mounted position of the flow cell in its holder, outlet tube 34 extends through open 56, as shown, and the corresponding outlet end of the flow cell is held in position in the holder by cementing, as at 70, or by other suitable means for securing tube 34 to the adjacent part of the holder. The opposite end of the flow cell is provided with a vertical solid tube 72 that extends through opening 58 and is secured, as by cementing or otherwise at 74, to the adjacent part of the holder, whereby the inlet end of the flow cell is held in position in its holder. A handle 76 is secured to the holder, as by screwing, whereby the holder and its flow cell can be conveniently handled, and it will be understood that the flow cell is mounted in its holder by vertical upward movement through the bottom of recess 44.

Referring now to FIG. 5, there is shown a colorimetric analysis apparatus 78 of the type which is shown in U.S. Patent No. 2,797,149 issued June 25, 1957 and which utilizes the flow cell and holder of the present invention. The analysis apparatus includes a proportioning pump 80 and a gas separating device 82 for removing air segments from a liquid stream containing said segments. The liquid sample which is to be treated for colorimetric analysis is transmitted, in the form of a stream, through a pump tube 84 to a fitting 86 where it joins a stream of air or other inert gas and a stream of a color producing reagent simultaneously transmitted through pump tubes 88 and 90, respectively. The fluids join each other in fitting 86 and form a segmented stream consisting of a series of liquid segments, each containing a portion of the liquid sample and a portion of the color reagent, separated from each other by an intervening gas segment. As indicated in the aforementioned U.S. Patent No. 2,797,149, the gas segments help cleanse the internal walls of the tubular passages of the apparatus. The constitutents of each liquid segment are mixed together in a horizontal helical mixing coil 92 and are transmitted from the mixing coil to the separating device 82 which is operable to remove the gas segments from the stream and form a consolidated liquid stream which is transmitted to the flow cell 12 for the colorimetric examination thereof.

The gas separating device comprises a horizontal tubular passage 94 which is connected to a vertical passage 96 at a point intermediate the length thereof to divide the passage into an upper part and a lower part. The upper part of the passage provides a tubular offtake into which the gas segments tend to rise and thereby escape from the segmented stream. To aid in the separation of the gas segments from the liquid segments, a pump suction tube 98 is connected to the upper part of the vertical passage for aspirating the gas segments from the liqiud stream, with only a minor portion of the liquid, and the major portion of the liquid flows downwardly into the lower part of the vertical passage, in the form of a consolidated stream, which is transmitted to the inlet tube 32 of flow cell 12 through tube 100. As indicated above, if any gas remains in the liquid stream which is introduced into the flow cell, said gas, which would be in the form of small bubbles, rises in the vertical inlet tube 28 of the flow cell and is directed by the curved wall part 36 along the upper wall 28a of member 22, and out of the passageway 30 through the vertical outlet tube 34.

The proportioning pump 80, which is schematically illustrated, may be of any suitable type though it is preferably of the type described in U.S. Patent No. 2,935,028 issued May 3, 1960. Briefly described, the pump comprises a plurality of resiliently flexible pump tubes which are compressed along their lengths during the pumping operation by the engagement therewith of a plurality of pressure rollers. The rollers move longitudinally of the pump tubes to fully close the tubes progressively along their lengths against a platen and thus propel the liquids or other fluids for transmitting them from sources of supply to points of delivery.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A flow cell for the colorimetric examination of a liquid comprising: a tubular member having a medial, elongated, substantially horizontal, tubular portion, which serves as a sight passageway, and which at one end thereof merges into a first distal, elongated, substantially vertical, downwardly extending, tubular portion, having a light permeable sidewall subportion which serves as one endwall for said medial portion, and which includes an interior, substantially concave surface in the flow path of liquid into said sight passageway from said downwardly extending portion, and at the other end thereof merges into a second distal, elongated, substantially vertical, upwardly extending, tubular portion, having a light permeable sidewall subportion which serves as the other endwall for said medial portion.

2. A flow cell for the colorimetric examination of a liquid comprising: an integral tubular member having a medial, elongated, substantially horizontal, tubular portion, which serves as a sight passageway; a first distal, elongated, substantially vertical, downwardly extending, tubular portion; said medial portion and said first distal portion having a first light permeable subportion in common which is formed both as an extension of the sidewall of said first distal portion and as one endwall of said medial portion and which includes an interior, substantially concave surface in the flow path of liquid into said sight passageway from said downwardly extending portion; a second distal, elongated, substantially vertical upwardly extending, tubular portion; said medial portion and said second distal portion having a second light permeable subportion in common which is formed both as an extension of the sidewall of said second distal portion and as the other endwall of said medial portion.

3. A flow cell for the colorimetric examination of a liquid comprising: a tubular member having a medial, elongated, substantially horizontal, tubular portion, for use as a sight passageway; a first distal, elongated, substantially vertical, downwardly extending, tubular portion, for use as a fluid inlet passageway to such sight passageway; said medial portion and said first distal portion having a first, light permeable, subportion in common which is formed both as an extension of the sidewall of said first distal portion and as one endwall of said medial portion, for use as a first light passageway to said flow cell, and which includes an interior, substantially concave surface to guide all fluid flowing from such inlet passageway along a single flow path into such sight passageway; a second distal, elongated, substantially vertical, upwardly extending, tubular portion, for use as a fluid outlet passageway from said sight passageway; said medial portion and said second distal portion having a second, light permeable, subportion in common which is formed both as an extension of the sidewall of said second distal portion and as the other endwall of said medial portion, for use as a second light passageway to said flow cell, and to guide all fluid flowing through such sight passageway along a single flow path out such outlet passageway.

4. Apparatus for the colorimetric examination of a liquid composing: a source of liquid; a sump for liquid; a source of light; a detector of light; a tubular flow cell having a medial, elongated, substantially horizontal, tubular portion, for use as a sight passageway, a first distal, elongated, substantially vertical, downwardly extending, tubular portion, coupled to said source of liquid for admitting a stream of liquid therefrom into one end of such sight passageway, said medial portion and said first distal portion having a first, light permeable, subportion in common which is formed both as an extension of the sidewall of said first distal portion and as one endwall of medial portion, for guiding all liquid, including any gas bubbles therein, along a single flow path into such sight passageway; a second distal, elongated, substantially vertical, upwardly extending, tubular portion, coupled to said sump for liquid for withdrawing the stream of liquid, including any gas bubbles therein, from such sight passageway, said medial portion and said second distal portion having a second, light permeable, subportion in common which is formed both as an extension of the sidewall of said second distal portion and as the other endwall of said medial portion, for guiding the stream of liquid, including any gas bubbles therein, from said sight passageway; said first subportion including an interior concave surface merging into the upper interior surface of said sight passageway and across the flow path of the fluid and any gas bubbles from said first portion for guiding any gas bubbles into a flow path along said upper interior surface of said sight passageway; said source of light being coupled to one of said light permeable subportions to transmit light into said sight passageway; said detector of light being coupled to the other of said light permeable subportions to receive light from said sight passageway.

5. A flow cell, and a holder therefor, for the colorimetric examination of a liquid comprising: a tubular flow cell having a medial, elongated, substantially horizontal, tubular portion which serves as a sight passageway, and, which at one end thereof merges into a first distal, elongated, substantially vertical, downwardly extending, tubular portion, having a light permeable sidewall subportion which serves as one endwall for said medial portion, which includes an interior, substantially concave surface in the flow path of liquid into said sight passageway from said downwardly extending portion, and at the other end thereof merges into a second distal, elongated, substantially vertical, upwardly extending, tubular subportion, having a light permeable sidewall subportion which serves as the other endwall for said medial portion; a holder including a block having a longitudinal, horizontal bore therethrough for receiving said flow cell medial portion therein, a vertical radial bore therethrough for receiving said upwardly extending flow cell second distal portion, and an elongated, vertical, radial slot extending up from the lower exterior of said block to said horizontal bore for passing said flow cell medial portion into said horizontal bore and said vertically extending flow cell second distal portion into said radial bore; and means for retaining said flow cell within said holder.

6. A flow cell, and a holder therefor, for the colorimetric examination of a liquid comprising: a tubular flow cell having a medial, elongated, substantially horizontal, tubular portion which serves as a sight passageway, and, which at one end thereof merges into a first distal, elongated, substantially vertical, downwardly extending, tubular portion, having a light permeable sidewall subportion which serves as one endwall for said medial portion, which includes an interior, substantially concave surface in the flow path of liquid into said sight passageway from said downwardly extending portion and at the other end thereof merges into a second distal, elongated, substantially vertical, upwardly extending, tubular subportion, having a light permeable sidewall subportion which serves as the other endwall for said medial portion; a holder including a block having a longitudinal, horizontal bore therethrough for receiving said flow cell medial portion therein, a vertical radial bore therethrough for receiving said upwardly extending flow cell second distal portion, and an elongated, vertical, radial slot extending up from the lower exterior of said block to said horizontal bore for passing said flow cell medial portion into said horizontal bore and said vertically extending flow cell second distal portion into said radial bore; and means disposed in said radial bore for retaining said flow cell second distal portion therein.

7. A flow cell, and a holder therefor, for the colorimetric examination of a liquid comprising: a tubular flow cell having a medial, elongated, substantially horizontal, tubular portion which serves as a sight passageway, and, which at one end thereof merges into a first distal, elongated, substantially vertical, downwardly extending, tubular portion, having a light permeable sidewall subportion which serves as one endwall for said medial portion, which includes an interior, substantially concave surface in the flow path of liquid into said sight passageway from said downwardly extending portion, and at the other end thereof merges into a second distal, elongated, substantially vertical, upwardly extending, tubular subportion, having a light permeable sidewall subportion which serves as the other endwall for said medial portion, and an elongated, substantially vertical, upwardly extending projection which is spaced from and parallel to said second distal portion; a holder including a block having a longitudinal, horizontal bore therethrough for receiving said flow cell medial portion therein, a first vertical, radial bore therethrough for receiving said upwardly extending flow cell second distal portion, a second vertical, radial bore therethrough, spaced from and parallel to said first vertical bore, for receiving said upwardly extending flow cell projection, and an elongated, vertical, radial slot extending up from the lower exterior of said block to said horizontal bore for passing said flow cell medial portion into said horizontal bore, said vertically extending flow cell second distal portion into said first vertical bore and said vertically extending flow cell projection into said second vertical bore; and means disposed in each of said vertical bores for respectively retaining said flow cell second distal portion and projection therein.

References Cited by the Examiner

UNITED STATES PATENTS

| | | | |
|---|---|---|---|
| 1,919,858 | 7/1933 | Pettingill | 23—230 |
| 2,439,572 | 4/1948 | Levin | 23—259 X |
| 2,797,149 | 6/1957 | Skeggs | 23—230 |
| 3,047,367 | 7/1962 | Kessler | 23—230 |
| 3,109,713 | 11/1963 | Ferrari et al. | 23—253 |

FOREIGN PATENTS

| | | |
|---|---|---|
| 1,021,170 | 11/1952 | France. |
| 192,183 | 10/1937 | Switzerland. |

MORRIS O. WOLK, *Primary Examiner.*